United States Patent [19]

Saito et al.

[11] Patent Number: 5,308,430
[45] Date of Patent: May 3, 1994

[54] REINFORCING FIBER SHEET, METHOD OF MANUFACTURING THE SAME, AND THE METHOD OF REINFORCING STRUCTURE WITH THE REINFORCING FIBER SHEET

[76] Inventors: Makoto Saito; Makoto Takezawa; Hiroshi Inoue, all c/o Tonen Corporation, Corporate Research and Development Laboratory, 3-1, Nishi-tsurugaoka 1-chrome, Oi-machi, Iruma-gun, Saitama-ken, Japan

[21] Appl. No.: 646,572

[22] Filed: Jan. 28, 1991

[30] Foreign Application Priority Data

| Jan. 30, 1990 | [JP] | Japan | 2-19927 |
| Jan. 30, 1990 | [JP] | Japan | 2-19928 |
| Apr. 10, 1990 | [JP] | Japan | 2-94436 |
| Apr. 10, 1990 | [JP] | Japan | 2-94437 |
| Apr. 10, 1990 | [JP] | Japan | 2-94438 |
| Oct. 12, 1990 | [JP] | Japan | 2-2755049 |

[51] Int. Cl.⁵ .................. B32B 5/08; B32B 31/00; B32B 35/00; C09J 5/00; C09J 7/04
[52] U.S. Cl. .................. 156/307.1; 156/307.3; 156/307.7; 428/231, 428/232; 428/236; 428/246; 428/251; 428/285; 428/286; 428/294
[58] Field of Search ............ 156/307.1, 307.3, 307.7; 428/231, 246, 251, 285, 286, 294, 232, 236

[56] References Cited

U.S. PATENT DOCUMENTS

| 4,435,470 | 3/1984 | Nicoachuk | 428/294 |
| 4,454,184 | 6/1984 | Britton | 428/294 |
| 4,454,192 | 6/1984 | Suzuki | 428/294 |
| 4,604,319 | 8/1986 | Evans et al. | 428/294 |
| 4,868,035 | 9/1989 | Weinberg et al. | 428/294 |
| 4,983,453 | 1/1991 | Beall | 428/294 |
| 4,997,693 | 3/1991 | Sonoh et al. | 428/294 |

FOREIGN PATENT DOCUMENTS

| 1212608 | 10/1986 | Canada . |
| 0072453 | 2/1983 | European Pat. Off. . |
| 0272793 | 6/1988 | European Pat. Off. . |
| 1091813 | 4/1955 | France . |
| 1282106 | 12/1962 | France . |
| 2434032 | 3/1980 | France . |
| 58-122860 | 7/1983 | Japan . |
| 365517 | 12/1962 | Switzerland . |
| 2029772 | 3/1980 | United Kingdom . |

Primary Examiner—James C. Cannon
Attorney, Agent, or Firm—Seidel, Gonda, Lavorgna & Monaco

[57] ABSTRACT

A reinforcing fiber sheet is provided which includes a support sheet and reinforcing fibers. The fibers are arranged in one direction on at least one surface of the support sheet and attached thereto through an adhesive layer. There is also provided a method of reinforcing a structure, which includes impregnating reinforcing fibers of the fiber sheets with a room temperature-settable resin, attaching the resin-impregnated fiber sheets to a surface of the structure, and thereafter setting the room temperature-settable resin.

6 Claims, 9 Drawing Sheets

FIG.11A  FIG.12A
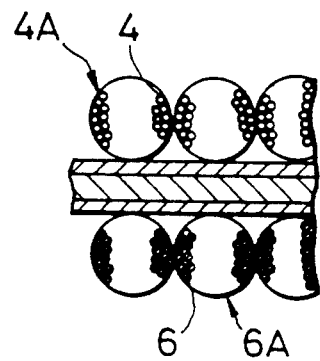
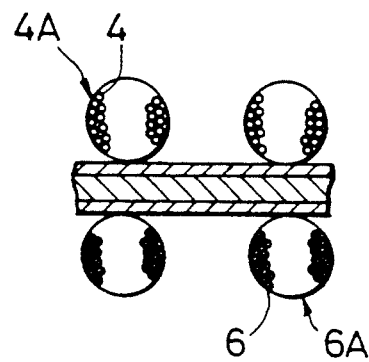
FIG.11B  FIG.12B
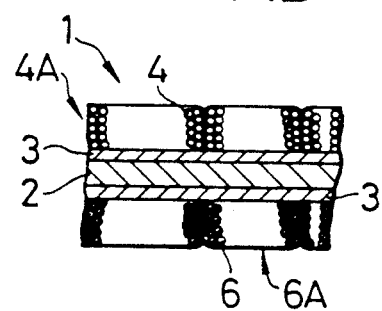
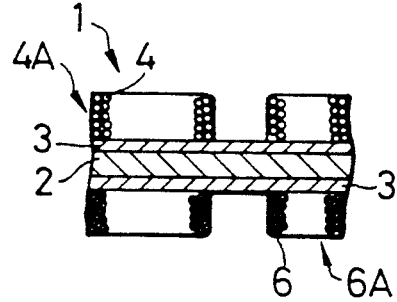
FIG.13
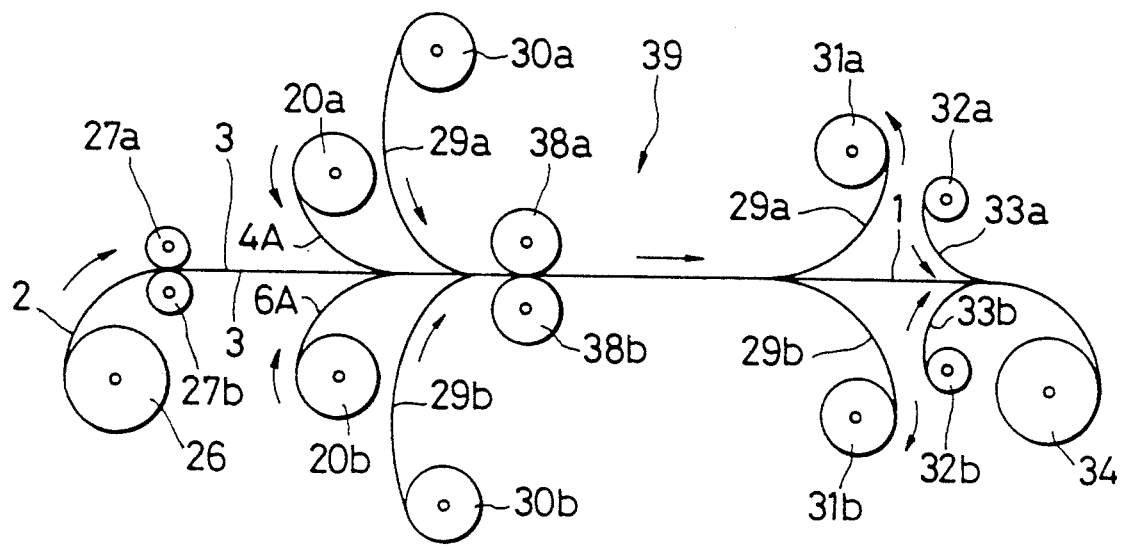

REINFORCING FIBER SHEET, METHOD OF MANUFACTURING THE SAME, AND THE METHOD OF REINFORCING STRUCTURE WITH THE REINFORCING FIBER SHEET

BACKGROUND OF THE INVENTION

1. Field of the Invention

The present invention relates to a reinforcing fiber sheet which can easily be handled at a reinforcement cite where structures, such as bridges or elevated roads, are reinforced using fiber reinforced plastics and which enables the reinforcement strength of the structure to be increased, a method of manufacturing such a reinforcing fiber sheet, and a method of reinforcing structures using the sheet.

2. Description of the Related Art

Reinforcement of bridges and piers of elevated roads using fiber reinforced plastics has been practiced.

Following reinforcing methods have been known:

(1) The method in which a set fiber reinforced plastic is adhered to the portion of a pier to be reinforced.

(2) The method in which a prepreg is adhered to the portion of a pier to be reinforced, a press tape is coated on the prepreg to prevent deformation which occurs during the thermosetting, and then the prepreg is caused to thermoset to make it a fiber reinforced plastic.

(3) The method in which a cloth made of reinforcing fibers is wound around the portion of a pier to be reinforced, the cloth is impregnated with a room-temperature setting type matrix resin, a press tape is coated on the cloth, and then the matrix resin is left to make it a fiber reinforced plastic.

However, the method itemized by (1) cannot be conducted on the curved portion of the pier, although it assures effective reinforcement efficiency.

The method itemized by (2) has a disadvantage in that it requires thermosetting of the prepreg adhered to the portion of the pier to be reinforced at the reinforcement cite.

The cloth employed in the method itemized by (3) is obtained by, for example, plainly or diagonally weaving reinforcing fibers, and is thus characterized in that it is weak at the intersections of warps and wefts. Hence, the cloth cannot assure sufficient reinforcement effect when it is made into a fiber reinforced plastic.

In another reinforcing method, reinforcing filaments impregnated with matrix resin are wound around the portion of the pier to be reinforced by the filament winding process and then thermoset to make it a fiber reinforced plastic at the cite. However, the structures on which this method can be performed are restricted, and expensive equipment is required. Hence, this method is not practical.

SUMMARY OF THE INVENTION

In view of the aforementioned problems of the conventional fiber reinforced plastics, an object of the present invention is to provide a reinforcing fiber sheet which can easily be handled at the reinforcement cite where structures, such as bridges or elevated roads, are reinforced using fiber reinforced plastics, and which enables reinforcement strength to be increased.

Another object of the present invention is to provide a method of manufacturing such a reinforcing fiber sheet.

Another object of the present invention is to provide a method of reinforcing structures using such a reinforcing fiber sheet.

To achieve the aforementioned objects, the present invention provides a reinforcing fiber sheet which comprises a support sheet, and reinforcing fibers arranged in one direction on at least one surface of the support sheet with an adhesive layer therebetween. Rigid first reinforcing fibers and tough second reinforcing fibers may be used as the reinforcing fibers. The support sheet may be of the resin-penetrable type. A curing accelerator for accelerating setting of a room-temperature setting type matrix resin which is conducted due to the presence of a curing agent may be present in the adhesive layer.

The present invention further provides a method of manufacturing a reinforcing fiber sheet in which reinforcing fibers are arranged in one direction on at least one surface of a support sheet with an adhesive layer provided therebetween. The method comprises the step of adhering the reinforcing fibers to at least one surface of the support sheet by means of the adhesive layer.

In one preferred form of the manufacturing method of the present invention, the reinforcing fiber sheet in which the reinforcing fibers are arranged in one direction on the at least one surface of the support sheet through the layer of adhesive is manufactured by aligning bundles of the reinforcing fibers in one direction on the adhesive layer apart from each other or close to each other and then by pressing the fiber bundles from above so as to adhere the reinforcing fibers to the adhesive layer in a slightly unfastened state.

The present invention further provides a method of reinforcing a structure which comprises the steps of attaching to a surface of a portion of the structure to be reinforced at least one reinforcing fiber sheet comprising a support sheet and reinforcing fibers arranged in one direction on at least one surface of the support sheet with an adhesive layer therebetween, and setting a room-temperature setting type matrix resin impregnated in the reinforcing fibers.

The reinforcing fibers may be impregnated with the matrix resin by coating the matrix resin on the reinforcing fiber sheet before the reinforcing fiber sheet is attached to the surface of the portion of the structure to be reinforced. Alternatively, the reinforcing fibers may be impregnated with the matrix resin by coating the matrix resin on the surface of the structure to be reinforced and then by attaching the reinforcing fiber sheet to the surface of the portion to be reinforced. Alternatively, the reinforcing fibers may be impregnated with the matrix resin by attaching the reinforcing fiber sheet to the surface of the structure to be reinforced and then by coating the matrix resin on the reinforcing fiber sheet.

BRIEF DESCRIPTION OF THE DRAWINGS

FIG. 2 (b) is a cross-sectional view showing the arrangement of the reinforcing fibers obtained from the fiber bundles shown in FIG. 2 (a);

FIG. 3 (b) is a cross-sectional view showing the arrangement of the reinforcing fibers obtained from the fiber bundles shown in FIG. 3 (a);

FIG. 11 (a) is a cross-sectional view showing one example of how to align bundles of reinforcing fibers when the reinforcing fiber sheet shown in FIG. 8 is manufactured;

FIG. 11 (b) is a cross-sectional view showing the arrangement of the reinforcing fibers obtained from the fiber bundles shown in FIG. 11 (a);

FIG. 12 (a) is a cross-sectional view showing another example of how to align bundles of reinforcing fibers when the reinforcing fiber sheet shown in FIG. 8 is manufactured;

FIG. 12 (b) is a cross-sectional view showing the arrangement of the reinforcing fibers obtained from the fiber bundles shown in FIG. 12 (a);

FIG. 13 explains one example of a method of manufacturing the reinforcing fiber sheet of FIG. 8;

FIG. 15 (b) is a cross-sectional view showing the arrangement of the reinforcing fibers obtained from the fiber bundles shown in FIG. 15 (a);

FIG. 16 (b) is a cross-sectional view showing the arrangement of the reinforcing fibers obtained from the fiber bundles shown in FIG. 16 (a);

DETAILED DESCRIPTION OF THE PREFERRED EMBODIMENTS

Embodiments of the present invention will now be described with reference to the accompanying drawings.

First Embodiment

Figure 1:
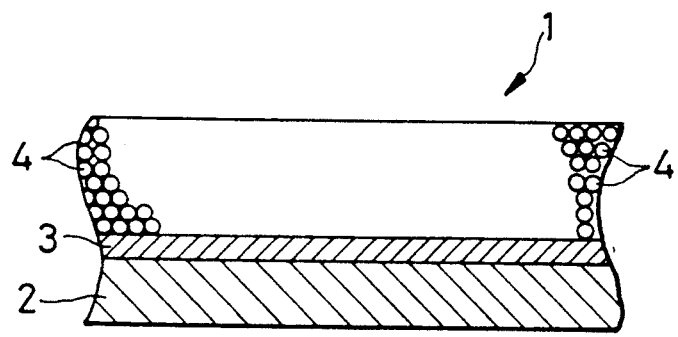
FIG. 1 is a cross-sectional view of a first embodiment of a reinforcing fiber sheet according to the present invention.

FIG. 1 is a cross-sectional view of a first embodiment of a reinforcing fiber sheet according to the present invention.

A reinforcing fiber sheet 1 is composed of a support sheet 2, and reinforcing fibers 4 arranged in one direction on one of the surfaces of the support sheet 2 with an adhesive layer 3 therebetween. The reinforcing fiber sheet 1 is hence a unidirectional reinforcing fiber sheet. The reinforcing fiber sheet 1 is employed for reinforcement with the reinforcing fibers 4 impregnated with a room-temperature thermosetting type matrix resin at the reinforcement cite such as a bridge or an elevated road.

The support sheet 2 of the reinforcing fiber sheet 1 may be made of a scrim cloth, a glass cloth, a sheet of release paper or a polymer film. Generally, it is not necessary for a resin-penetrable type support sheet 2 to be used. However, when it is desired to impregnate the reinforcing fibers 4 with the matrix resin from the side of the sheet 2, a sheet 2 made of a scrim cloth or a glass cloth is used. To provide a sheet 2 which is flexible and which is strong enough to support the reinforcing fibers 4, the thickness of the sheet 2 is set between 1 and 500 $\mu$m, more preferably, between 5 and 100 $\mu$m.

Although any adhesive can be used to form the adhesive layer 3 of the reinforcing fiber sheet 1 so long as it can adhere the reinforcing fibers 4 to the support sheet 2 at least temporarily, an adhesive made of a resin which exhibits compatibility with respect to the matrix resin is preferably used. For example, in a case when an epoxy or unsaturated polyester resin is used as the matrix resin, an adhesive made of an epoxy resin is desirably used. The preferred thickness of the adhesive layer 3 is from 5 to 100 $\mu$m, with more preferred thickness being from 10 to 30 $\mu$m. An adhesive layer having such a thickness is capable of adhering the reinforcing fibers 4 at least temporarily.

A plurality of bundles of filaments or reinforcing fibers 4 converged using a sizing agent or due to slight twisting are placed on the adhesive layer 3 and then pressed from above to make the reinforcing fibers 4 slightly unfastened. In this way, the reinforcing fibers 4 are adhered to the support sheet 2 through the adhesive layer 3 in a state where they are piled in a plurality of layers due to the presence of the sizing agent or due to the twisting and where they are arranged in one direction. The unidirectional reinforcing fiber sheet 1 of the present embodiment is thus obtained.

Figure 2A:
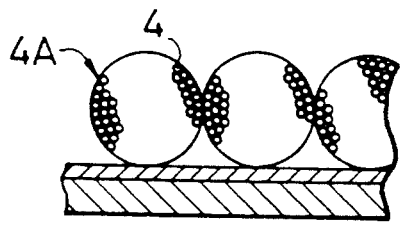
FIG. 2 (a) is a cross-sectional view showing one example of how to align bundles of reinforcing fibers when the reinforcing fiber sheet shown in FIG. 1 is manufactured.
Figure 3A:
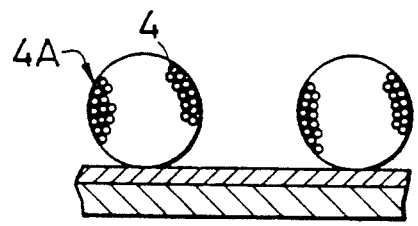
FIG. 3 (a) is a cross-sectional view showing another example of how to align bundles of reinforcing fibers when the reinforcing fiber sheet shown in FIG. 1 is manufactured.
Figure 2B:
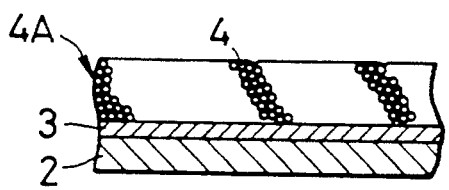
Figure 3B:
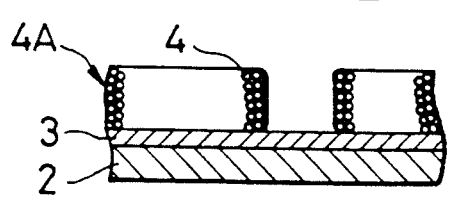

The bundles 4A of fibers 4 may be initially aligned in the longitudinal direction on the support sheet 2 with the adhesive layer 3 therebetween in such a manner that they are close to each other with no gap in the lateral direction, as shown FIG. 2(a), and then pressed from above so that the lower portions thereof can be adhered to the support sheet 2 with the adhesive layer 3, as shown in FIG. 2(b), to provide the reinforcing fibers 4 on the support sheet 2 close to each other in the lateral direction thereof. Alternatively, the bundles 4A of fibers 4 may be aligned in the longitudinal direction on the support sheet 2 with the adhesive layer 3 therebetween in such a manner that they are separated from each other in the lateral direction, as shown in FIG. 3 (a), and then pressed from above so that the lower portions thereof can be adhered to the adhesive layer 3, as shown in FIG. 3 (b), to provide the reinforcing fibers 4 on the support sheet 2 apart from each other in the lateral direction thereof.

The bundles 4A of fibers 4 may be used bundles of fibers, i.e., bundles of filaments, on which filamentation is conducted between the filaments or alternatively bundles of filaments on which filamentation is not conducted between the filaments. The degree of pressing of the bundles 4A of fibers 4 is determined by a desired thickness of the plurality of layers of reinforcing fibers 4. In the case of carbon fiber bundle which is about 12000 carbon fiber filaments each having a diameter of 5 to 15 μm, the carbon fibers may be crushed to a degree which ensures that they have a lateral width of about 5 mm.

Suitable examples of the reinforcing fibers 4 include pitch type carbon fibers, boron fibers, PAN type carbon fibers, aramid fibers, glass fibers, steel fibers, polyester fibers, and polyethylene fibers.

Figure 4:
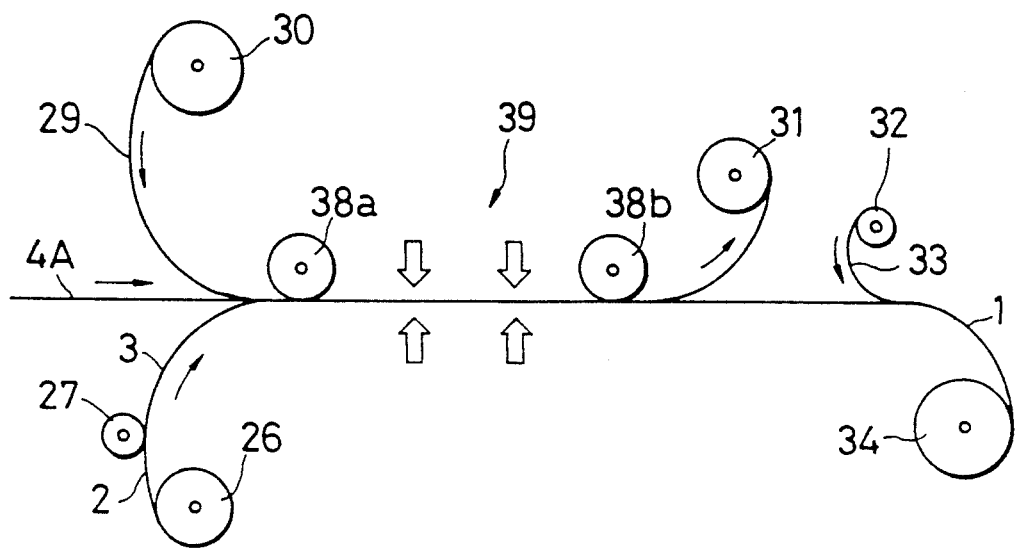
FIG. 4 explains one example of a method of manufacturing the reinforcing fiber sheet of FIG. 1.

The unidirectional reinforcing fiber sheet 1 described above can continuously be manufactured in the manner shown, for example, in FIG. 4.

More specifically, after an adhesive is coated on a support sheet 2 supplied from a sheet supply roll 26 by means of an adhesive coating roll 27 to form the adhesive layer 3, the sheet 2 is fed to a pressing portion 39 in which a pair of pressing roller 38a and 38b are provided separate from each other. Concurrently with this, the fiber bundles 4A of the reinforcing fibers 4 and a sheet of release paper 29 from a release paper roll 30 are fed into the pressing portion 39 where the fiber bundles 4A are aligned on the adhesive layer 3 on the sheet 2 in one direction and then the release paper 29 is placed on the fiber bundles 4A. In that state, the reinforcing fiber sheet 2 is pressed by means of the pressing rollers 38a, 38b and a support plate (not shown) so as to press the fiber bundles 4A and thereby adhere the slightly unfastened reinforcing fibers 4 to the sheet 2 through the adhesive layer 3. Thereafter, the release paper 29 is rolled on a release paper roll 31, and the reinforcing fibers 4 are covered with a cover film 33 supplied from a film supply roll 32, when necessary. In this way, the reinforcing fiber sheet 1 with the reinforcing fibers 4 arranged in one direction on the support sheet 2 through the adhesive layer 3 is continuously manufactured. The obtained sheet 1 is rolled on a sheet roll 34.

As stated above, the unidirectionally arranged reinforcing fiber sheet 1 according to the present invention is used for reinforcement with the reinforcing fibers 4 impregnated with the room-temperature setting type matrix resin. Impregnation of the reinforcing fibers 4 is conducted at the reinforcement cite. An epoxy or unsaturated polyester resin to which a curing agent or curing accelerator is added for the purpose of making the resin set at room temperatures is used as the room-temperature setting type matrix resin.

According to the present invention, reinforcement of structures using the unidirectionally arranged reinforcing fiber sheet 1 is conducted in the manner described below.

Figure 5:
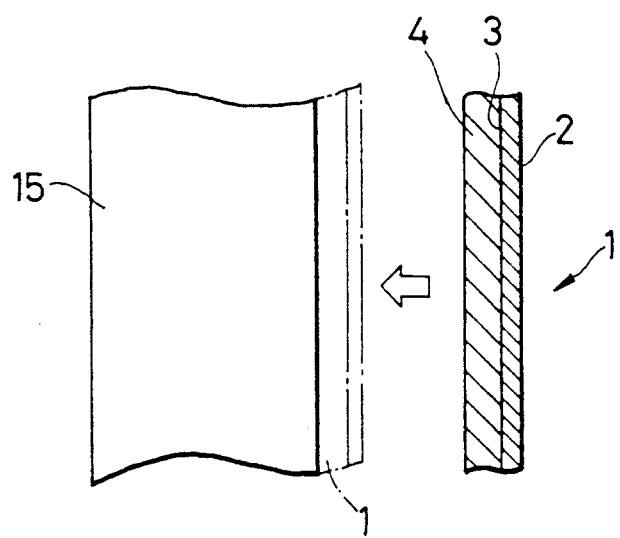
FIG. 5 explains one form of a reinforcing method in the first embodiment.

More specifically, in one preferred form of the present invention, a room-temperature setting type matrix resin is coated on the reinforcing fibers 4 of the unidirectionally arranged reinforcing fiber sheet 1 by means of adequate coating means, such as a roller, a brush or spraying, at the reinforcement cites of structures, such as bridges or the piers of elevated roads. Thereafter, the reinforcing fiber sheet 1 is attached to a portion 15 to be reinforced with the reinforcing fibers 4 facing the portion 15 to be reinforced, as shown in FIG. 5. After a desired number of sheets 1 have been piled, impregnation operation of the matrix resin is further conducted using a hand roller or the like. Subsequently, the sheets 1 are covered with a press tape and then left untouched for a while to make the matrix resin set and thereby make the sheet 1 a fiber reinforced plastic. In this way, reinforcement of a structure using the fiber reinforced plastic is performed.

Figure 6:
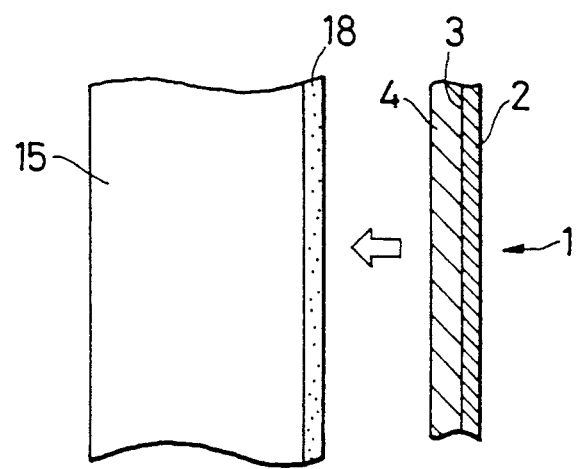
FIG. 6 explains another form of the reinforcing method in the first embodiment.

In another preferred form of the present invention, a room-temperature setting type matrix resin 18 is coated on the portion 15 to be reinforced to a thickness of, for example, about 100 μm, as shown in FIG. 6, and a desired number of unidirectionally arranged reinforcing fiber sheet 1 are piled and pressed with the reinforcing fibers 4 facing the portion 15 to be reinforced, by which the sheets 1 are attached and at the same time the reinforcing fibers 4 are impregnated with the matrix resin 18. In that case, each time the sheet 1 is placed on the previously placed sheet 1, the matrix resin may be coated on the support sheet 2 of the previously placed sheet 1. Thereafter, the sheets 1 are covered with the press tape, and then left for a while to make the matrix resin set and thereby make the sheets 1 fiber reinforced plastics. In this way, reinforcement of structures using the fiber reinforced plastic is conducted as in the aforementioned case.

Figure 7:
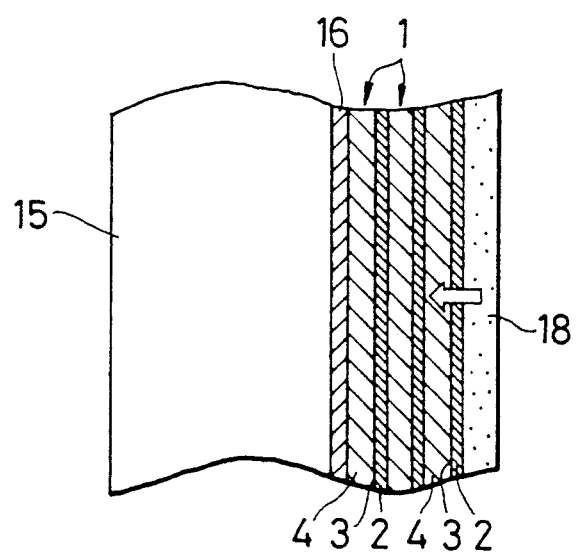
FIG. 7 explains another form of the reinforcing method in the first embodiment.

In another preferred form of the present invention, a unidirectionally arranged reinforcing fiber sheet 1 with a resin-penetrable type support sheet 2 is used. As shown in FIG. 7, a resin of the same type as the matrix resin is coated on the portion 15 to be reinforced as a primer 16, and a desired number of sheets 1 are then piled on top of another on the primer 16. Thereafter, the room-temperature setting matrix resin 18 is coated on the support sheet 2 of the outermost sheet 1 by means of a roller or the like. The matrix resin penetrates the sheet 2 and then enters the reinforcing fibers 4. Thereafter, the sheets 1 are covered with the press tape, and then left untouched for a while to make the matrix resin 18 set and thereby make the sheets 1 fiber reinforced plastics. In this way, reinforcement of structures using the fiber reinforced plastics is conducted, as in the case of the aforementioned cases.

In the above-described reinforcement methods, when structures, such as bridges or elevated roads, are reinforced using fiber reinforced plastics, the reinforced fiber sheet 1 on which the reinforced fibers are arranged on the support sheet 2 in one direction is used. The reinforcing fibers 4 are impregnated with a room-temperature setting type matrix resin at a reinforcement cite to make the sheet 1 ready for use. The sheet 1 impregnated with the matrix resin is attached to the portion to be reinforced and left untouched to make the matrix resin set and thereby make the sheet 1 a fiber reinforced plastic. Consequently, a troublesome work of thermosetting the matrix resin can be eliminated and workability of reinforcement of structures using the fiber reinforced plastics can thus be improved.

Furthermore, since the reinforcing fibers 4 are arranged in one direction, reduction in the strength of the fiber reinforced plastic, which would occur when the reinforcing fibers 4 are woven into a cloth, can be eliminated, and the reinforcement strength can thus be increased. Furthermore, after the sheet 1 is attached to the portion to be reinforced, the matrix resin is set. As a result, the sheet 1 can also be applied to the curved portion to be reinforced.

In the above-described examples of the reinforcement method, the reinforcing fiber sheets 1 are piled on top of another with the reinforcing fibers 4 facing the portion 15 to be reinforced. However, the reinforcing fiber sheets 1 may also be piled with the support sheet 2 facing the portion 15 to be reinforced. Furthermore, in the above examples of the reinforcement method, the room-temperature setting type matrix resin is left for setting. However, setting of the matrix resin may also be accelerated by heating.

Second Embodiment

Figure 8:
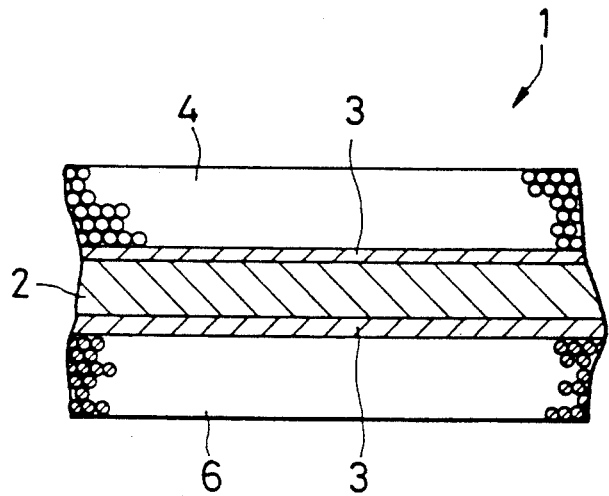
FIG. 8 is a cross-sectional view of a second embodiment of the reinforcing fiber sheet according to the present invention.

FIG. 8 is a cross-sectional view of a second embodiment of the reinforced fiber sheet according to the present invention.

The reinforcing fiber sheet 1 is composed of the support sheet 2, rigid first reinforcing fibers 4 adhered to one of the surfaces of the support sheet 2 through the adhesive layer 3 in a state wherein they are arranged in one direction, and tough second reinforcing fibers 6 adhered on the other surface of the support sheet 2 through the adhesive layer 3 in a state wherein they are arranged in one direction. The reinforcing fiber sheet 1 hence employs hybrid reinforcing fibers. Other structures of the reinforcing fiber sheet 1 of this embodiment are the same as those of the first embodiment. In FIG. 8, the same reference numerals are therefore used to denote parts which are the same as those shown in FIG. 1.

In the present invention, the reinforcing fiber sheet 1 is formed as a hybrid sheet by providing the rigid first reinforcing fibers 4 on one of the surfaces of the support sheet 2 and by providing the tough second reinforcing fibers 6 on the other surface of the support sheet 2 for the purpose of increasing the fracture strength or energy and thereby reducing generation of cracks by the presence of the rigid first reinforcing fibers 4 and for the purpose of increasing the fracture toughness of the structure and thereby ; postponing fracture by the presence of the tough second reinforcing fibers 6 when the reinforcing fiber sheet 1 is used for reinforcing structures in the form of a fiber reinforced plastic.

Figure 9:
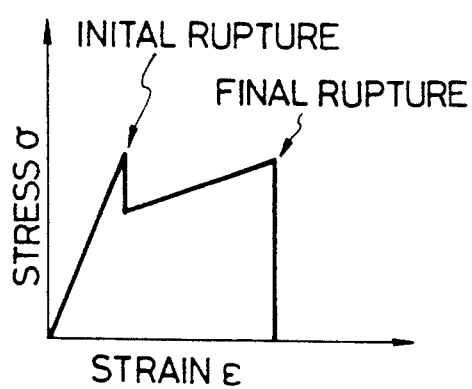
FIG. 9 is a graph schematically showing a stress-elongation strain curve of a fiber reinforced plastic when a vertical load is applied to the surface of the hybrid fiber reinforced plastic obtained from a hybrid reinforcing fiber sheet on which rigid and tough reinforcing fibers are provided on the two surfaces of a support sheet.
Figure 10:
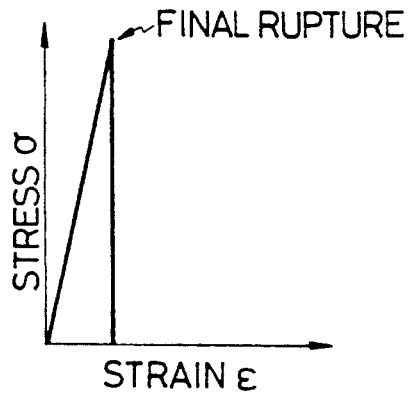
FIG. 10 is a graph similar to FIG. 9 for a fiber reinforced plastic obtained from a reinforcing fiber sheet on which one type of reinforcing fibers which is more rigid but less tough than the reinforcing fibers employed in FIG. 9 is provided on the two surfaces of the support sheet.

FIG. 9 is a graph schematically showing a stress-strain curve of a fiber reinforced plastic which is obtained when a vertical load is applied to the surface of a hybrid fiber reinforced plastic obtained by providing the rigid and tough reinforcing fibers on the two surfaces of the reinforcing fiber sheet. FIG. 10 is a graph similar to FIG. 9, showing a stress-strain curve of a fiber reinforced plastic obtained by providing on the two surfaces of the reinforcing fiber sheet one type of reinforcing fibers which are more rigid and less tough than the reinforcing fibers employed in FIG. 9.

In the case of the hybrid fiber reinforced plastic, although stress $\sigma$ thereof is not so large as that of the non-hybrid fiber reinforced plastic, the strain $\epsilon$ is large, as shown in FIG. 9. After the initial rupture of the rigid reinforcing fibers, the tough reinforcing fibers stretch greatly and thereby postpones final rupture of the tough reinforcing fibers. The fracture energy indicated by the area surrounded by the curve in FIG. 9 is large. That is, the time required for the entirety of the fiber reinforced plastic to repture is long.

In the case of the non-hybrid fiber reinforced plastic, although stress $\sigma$ is large, strain $\epsilon$ is small, as shown in FIG. 10. The final rupture occurs immediately after fracture of reinforcing fibers is started. The fracture energy indicated by the area surrounded by the curve in FIG. 10 is small, i.e., the time required for the entirety of the fiber reinforced plastic to rupture is short.

Hence, the use of a hybrid fiber reinforced plastic, obtained by using the reinforcing fiber sheet 1 with two types of reinforcing fibers, the rigid reinforcing fibers and the tough reinforcing fibers, provided, increases the fracture energy of the structure and thereby reduces generation of cracks. At the same time, the use of the hybrid fiber reinforced plastic increases the fracture toughness of the structure and thereby postpones fracture after generation of cracks in the structure. It is therefore possible to assure safety of reinforcement of structures using the fiber reinforced plastics.

In practice, rigid first reinforcing fibers 4 having a modulus of elasticity of 5 ton/mm$^2$ or above is preferred. Tough second reinforcing fibers 6 having an elongation at rupture of 1.2% or above which is higher than the elongation at rupture of the first reinforcing fibers 4 by 20% or above is preferably used. First reinforcing fibers 4 having a modulus of elasticity of less than 5 ton/mm$^2$ cannot sufficiently increase the fracture strength of the structure. Second reinforcing fibers 6 having an elongation at rupture of less than 1.2% which is not higher than the elongation at rupture of the first reinforcing fibers 4 by 20% or above cannot increase the fracture toughness of the structure sufficiently.

The reinforcing fibers 4 and 6 may be pitch type carbon fibers, boron fibers, PAN type carbon fibers, aramid fibers, glass fibers, steel fibers, polyester fibers or polyethylene fibers, if they are combined to satisfy the above properties.

When the reinforcing fiber sheet 1 is manufactured, the fiber bundles 4A and 6A of the reinforcing fibers 4 and 6 are aligned on the adhesive layers 3 formed on the two surfaces of the support sheet 2 close to each other or apart from each other, as shown in FIGS. 11 (a) and 12 (a), as in the case of the first embodiment. FIGS. 11 (b) and 12 (b) respectively show the arrangement of the reinforcing fibers 4 and 6 obtained from the alignment of the fiber bundles 4A and 6A shown in FIGS. 11 (a) and 12 (a).

The hybrid reinforcing fiber sheet 1 described above can be manufactured continuously in the manner shown in, for example, FIG. 13.

After an adhesive is coated on the two surfaces of the support sheet 2 supplied from the sheet supply roll 26 by means of adhesive coating roll 27a and 27b to form the adhesive layers 3, the sheet 2 is fed into a pressing portion 39. At the same time, the rigid first reinforcing fiber bundles 4A and the tough second reinforcing fiber bundles 6A are respectively fed from reinforcing fiber supply rolls 20a and 20b into the pressing portion 39 where they are aligned in one direction on the adhesive layers 3 on the two surfaces of the sheet 2. Also, sheets of release paper 29a and 29b are respectively fed from release paper rolls 30a and 30b into the pressing portion 39 where they are placed on the fiber bundles 4A and 6A.

In the pressing portion, the fiber bundles 4A and 6A are pressed and thereby adhered to the respective surfaces of the sheet 2 through the adhesive layers 3 in a slightly unfastened state by means of the pair of pressing rollers 38a and 38b. Thereafter, the sheets of release paper 29a and 29b are respectively rolled on release paper rolls 31a and 31b, by which a hybrid reinforcing fiber sheet 1 with the rigid first reinforcing fibers 4 and the tough second reinforcing fibers 6 respectively disposed on the two surfaces of the support sheet 2 through the adhesive layers 3 in one direction is obtained.

After the reinforcing fibers 4 and 6 of the reinforcing fiber sheet 1 are respectively covered with cover films 33a and 33b respectively supplied from film supply rolls 32a and 32b, when necessary, the reinforcing fiber sheet 1 is rolled on the sheet roll 34.

Reinforcement of structures using the hybrid reinforcing fiber sheet 1 is conducted in the same manners shown in FIGS. 5 to 7.

According to the reinforcing method which uses the reinforcing fiber sheet 1 of this embodiment, a troublesome work of thermosetting the matrix resin at the reinforcement cite can be eliminated, and workability of the reinforcement of structures using the fiber reinforced plastic can thus be enhanced, as in the case of the first embodiment. Furthermore, reinforcement strength can be increased, and reinforcement of a curved portion is made possible. Furthermore, in this embodiment, since the first reinforcing fibers 4 of the reinforcing fiber sheet 1 have a modulus of elasticity of 5 tons/mm$^2$ or above while the second reinforcing fibers 6 have an elongation at rupture of 1.2% or above which is higher than the elongation at rupture of the first reinforcing fibers 4 by 20% or above, the use of a resultant hybrid fiber reinforced plastic increases the fracture strength of the structure and thereby reduces generation of cracks due to the presence of the rigid first reinforcing fibers 4 and increases the fracture toughness of the structure and thereby postpones rupture of the structure due to the presence of the tough second reinforcing fibers 6.

An example of the second embodiment will be described below.

Carbon fibers and polyester fibers (trademark: Vectran, manufactured by Kurare) were respectively used as the rigid first reinforcing fibers and the tough second reinforcing fibers. The carbon fibers and the polyester fibers were provided on the respective surfaces of the support sheet at a unit weight of 175 g/m$^2$ and in one direction thereof to form a hybrid reinforcing fiber sheet.

The modulus of elasticity of the used carbon fibers was 23.5 ton/mm$^2$ in strand strength measurement method (JIS method), and the elongation thereof was 1.4%. The modulus of elasticity of the used polyester fibers was 8.5 ton/mm$^2$, and the elongation thereof was 2.5%.

After the first and second reinforcing fibers of the hybrid reinforcing fiber sheet were impregnated with the matrix resin which was room-temperature setting type epoxy resin, the matrix resin was left at room temperatures to make it set, by which hybrid fiber reinforced plastic was obtained. Samples of the obtained fiber reinforced plastic had a width of 15 mm. Tests were conducted by applying a vertical load to the samples to measure the loads and elongations at the initial and final ruptures and thereby examine the effect of the fiber reinforced plastic made from the hybrid reinforcing fiber sheet according to the present invention.

For comparison, a reinforcing fiber sheet was manufactured by providing the carbon fibers employed in the above example on the two surfaces of the support sheet at a unit weight of 175 g/m$^2$ and in one direction. The carbon fibers were impregnated with the matrix resin and then left to make the matrix resin set. The same tests were conducted.

Table 1 shows the results of the tests.

TABLE 1

| Initial Rupture Load Elongation | | Final Rupture Load Elongation | | Rigidity | Fracture Energy |
|---|---|---|---|---|---|
| (kg) | (%) | (kg) | (%) | (ton) | (kg. %) |
| Present Invention | | | | | |
| 550 | 1.01 | 530 | 2.50 | 54.5 | |
| (3.0) | (7.9) | (3.1) | (6.5) | (1.9) | 832 |
| Comparative Example | | | | | |
| — | — | 726 | 1.01 | 68.9 | |
|  |  | (9.1) | (8.1) | (2.3) | 367 |

In Table 1, the loads at the initial and final ruptures are the average values of those obtained in the tests conducted seven times, and the elongations are the average values of five values. The numerals in parentheses are CV (coefficient of variation) values which indicate the degree of variation. The rigidity is the rigidity of the entire fiber reinforced plastic indicated in the form of load/elongation. The fracture energy is calculated by triangle approximation from the stress-strain curve similar to those shown in FIGS. 9 and 10.

As is clear from Table 1, since the hybrid reinforcing fiber sheet with rigid carbon fibers and tough polyester fibers provided thereon is used to obtain a fiber reinforced plastic in the present invention, the elongation and fracture energy are about 2.5 times those of the non-hybrid fiber reinforced plastic obtained from the reinforced fiber sheet with only the carbon fibers provided thereon, although the load at the final rupture is smaller. Consequently, fracture of the reinforcing fibers does not cause immediate final rupture, and safety of the reinforced structures with the fiber reinforced plastics is thus assured.

Third Embodiment

Figure 14:
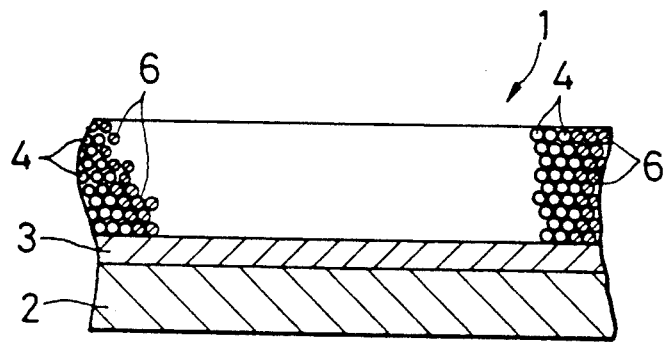
FIG. 14 is a cross-sectional view of a third embodiment of the reinforcing fiber sheet according to the present invention.

FIG. 14 is a cross-sectional view of a third embodiment of the reinforcing fiber sheet 1 according to the present invention.

The reinforcing fiber sheet 1 of this embodiment differs from that of the second embodiment in that the rigid first reinforcing fibers 4 and the tough second reinforcing fibers 6 are provided in one direction on one of the surfaces of the support sheet 2 through the adhesive layer 3. Other configurations of this embodiment are the same as those of the second embodiment.

Figure 15A:
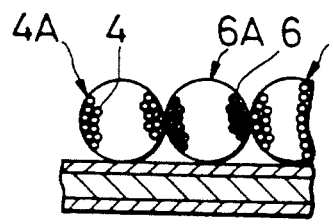
FIG. 15 (a) is a cross-sectional view showing one example of how to align bundles of reinforcing fibers when the reinforcing fiber sheet shown in FIG. 14 is manufactured.
Figure 16A:
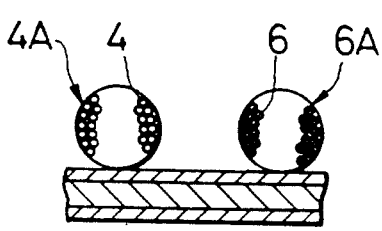
FIG. 16 (a) is a cross-sectional view showing another example of how to align bundles of reinforcing fibers when the reinforcing fiber sheet shown in FIG. 14 is manufactured.
Figure 15B:
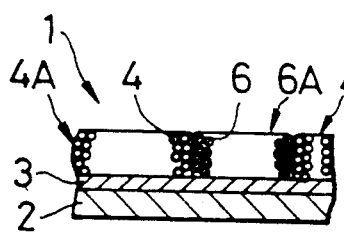
Figure 16B:
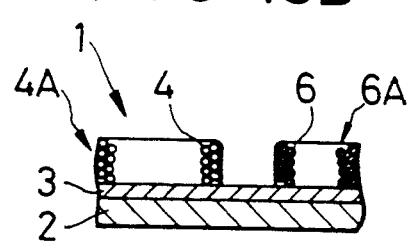

When the reinforcing fiber sheet 1 of this embodiment is manufactured, the fiber bundles 4A and 6A of the reinforcing fibers 4 and 6 are aligned on the adhesive layer 3 formed on one of the two surfaces of the support sheet 2 close to each other or apart from each other, as shown in FIGS. 15 (a) and 16 (a), as in the case of the first embodiment. FIGS. 15 (b) and 16 (b) show the arrangement of the reinforcing fibers 4 and 6 obtained from the alignment of the fiber bundles 4A and 6A shown in FIGS. 15 (a) and 16 (a).

Figure 17:
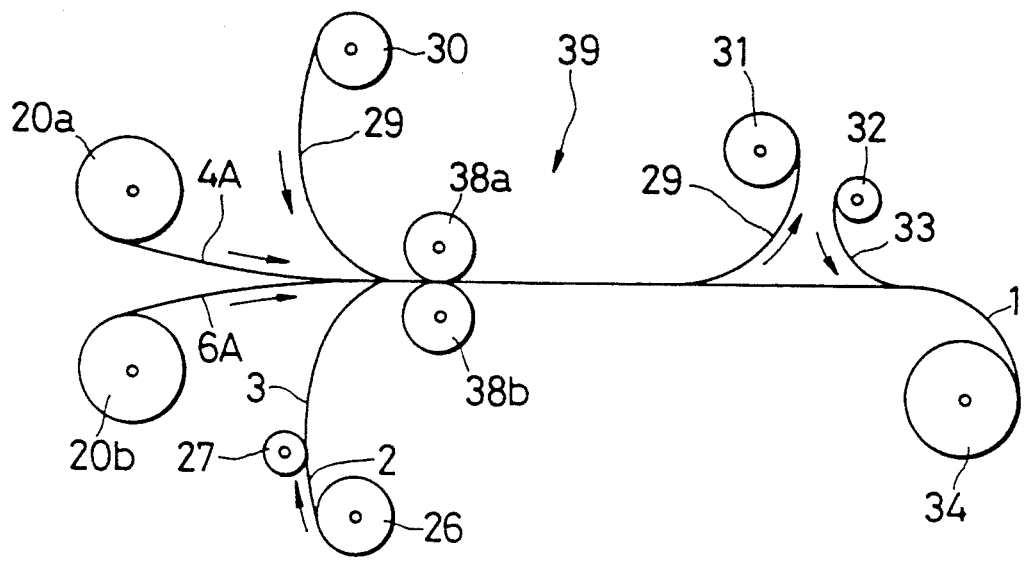
FIG. 17 explains one example of a method of manufacturing the reinforcing fiber sheet of FIG. 14.

The hybrid reinforcing fiber sheet 1 described above can be manufactured continuously in the manner shown in, for example, FIG. 17.

More specifically, after an adhesive is coated on the support sheet 2 supplied from the sheet supply roll 26 by means of the adhesive coating roll 27 to form the adhesive layer 3, the sheet 2 is fed to the pressing portion 39. Concurrently with this, the rigid first reinforcing fiber bundles 4A and the tough second reinforcing fiber bundles 6A are respectively fed from reinforcing fiber supply rolls 20a and 20b into the pressing portion 39 where they are aligned on the adhesive layer 3 in one direction. Also, the sheet of release paper 29 is fed from the release paper roll 30 into the pressing portion 39 where the release paper 29 is placed on the fiber bundles 4A and 6A.

In the pressing portion 39, the fiber bundles 4A and 6A are pressed and thereby adhered to the surface of the sheet 2 through the layer of adhesive 3 in a slightly unfastened state by means of the pair of pressing rollers 38a and 38b. Thereafter, the sheet of release paper 29 is rolled on the release paper roll 31, by which the hybrid reinforcing fiber sheet 1 with the rigid first reinforcing fibers 4 and the tough second reinforcing fibers 6 disposed on one surface of the support sheet 2 through the adhesive layer 3 in one direction is obtained.

After the reinforcing fibers 4 and 6 of the reinforcing fiber sheet 1 are covered with the cover film 33 supplied from film supply roll 32, when necessary, the reinforcing fiber sheet 1 is rolled on the sheet roll 34.

Reinforcement of structures using the hybrid reinforcing fiber sheet 1 of this embodiment is conducted in the same manners as those shown in FIGS. 5 to 7.

According to the reinforcing method which uses the reinforcing fiber sheet 1 of this embodiment, a troublesome work of thermosetting the matrix resin at the reinforcement cite can be eliminated, and workability of the reinforcement of structures using the fiber reinforced plastic can thus be enhanced. Furthermore, reinforcement of a curved portion is made possible. Furthermore, the use of the hybrid reinforcing fiber sheet 1 increases the fracture and toughness strengths of the structure, as in the case of the second embodiment.

Fourth Embodiment

In this embodiment, the method of reinforcing structures without using the hybrid reinforcing fiber sheet, which ensures the same effect as that obtained in the case wherein the hybrid reinforcing fiber sheet is used, will be described.

Figure 18A:
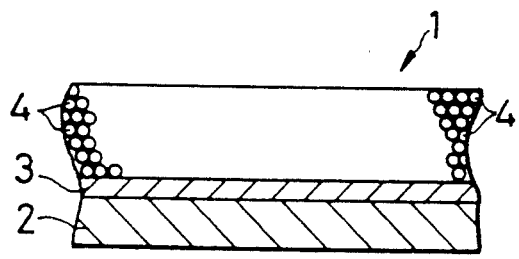
FIGS. 18 (a) and 18 (b) are cross-sectional views showing reinforcing fiber sheets employed in the fourth embodiment of the reinforcing method according to the present invention.
Figure 18B:
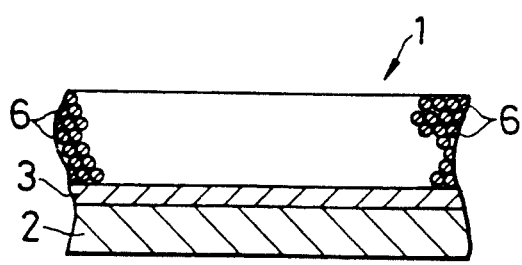

In the aforementioned second and third embodiments, the hybrid reinforcing fiber sheet 1 provided using the rigid first reinforcing fibers and tough second reinforcing fibers is used to obtain a hybrid fiber reinforced plastic. In this embodiment, in order to obtain a fiber reinforced plastic as effective as the hybrid fiber reinforced plastic, the reinforcing fiber sheet 1 (called the first reinforcing fiber sheet) using the rigid first reinforcing fibers 4, shown in FIG. 18 (a), and the reinforcing fiber sheet 1 (called the second reinforcing fiber sheet) employing the tough second reinforcing fibers 6, shown in FIG. 18 (b), are used for reinforcement.

The first and second reinforcing fiber sheets 1 are respectively unidirectionally arranged reinforcing fiber sheets obtained by respectively providing the reinforcing fibers 4 and 6 on one of the surfaces of the support sheets through the adhesive layers 3 in one direction. The reinforcing fibers 4 and 6 employed in this embodiment and other configurations are the same as those of the second and third embodiments.

Each of the first and second reinforcing fiber sheets 1 is used for reinforcing the structure in a number of at least one from the gist of this reinforcing method. However, either first or second reinforcing fiber sheet 1 or both the first and second reinforcing fiber sheets 1 may be used in at least two depending on the degree of reinforcement conducted on the portion to be reinforced. Furthermore, the first and second reinforcing fiber sheets are piled alternately or in other ways. Also, the reinforcing fiber sheet which is first placed on the portion to be reinforced may be either the first or second reinforcing fiber sheet 1.

In this embodiment, reinforcement is conducted in the similar manners to those shown in FIGS. 5 to 7.

Figure 19:
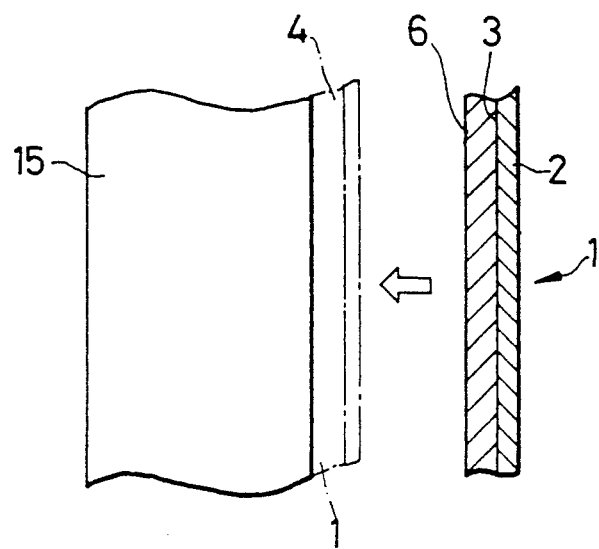
FIG. 19 explains one form of the reinforcing method in the fourth embodiment.

More specifically, in one preferred form of the present invention, the room-temperature setting type matrix resin is coated on the reinforcing fibers 4 and 6 of the first and second reinforcing fiber sheets 1 by means of adequate coating means, such as a roller, a brush or spraying, at the reinforcement cite of structures, such as bridges or the piers of elevated roads. Thereafter, the first and second reinforcing fiber sheets 1 are attached to the portion 15 to be reinforced in a desired order and in a desired number with the reinforcing fibers 4 and 6 facing the portion 15 to be reinforced, as shown in FIG. 19. After impregnation operation of the matrix resin is further conducted using a hand roller or the like, the reinforcing fiber sheets are covered with the press tape and then left untouched to set the matrix resin and thereby make the first and second reinforcing fiber sheets 1 fiber reinforced plastics. In this way, reinforcement of a structure using the hybrid fiber reinforced plastic obtained from the first and second reinforcing fiber sheets 1 is performed.

Figure 20:
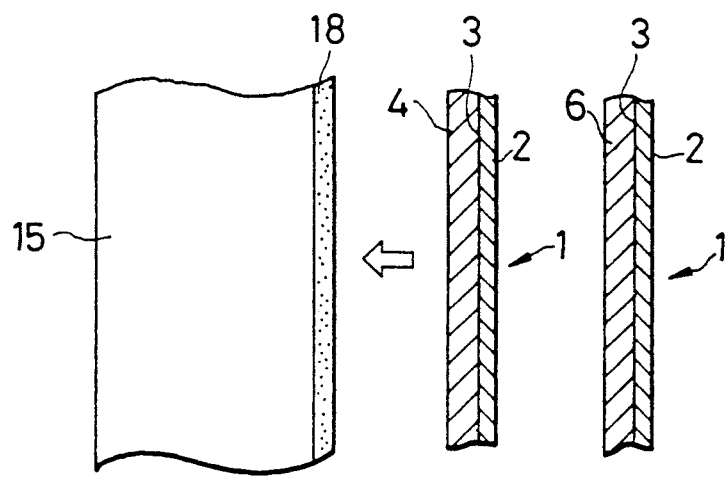
FIG. 20 explains another form of the reinforcing method in the fourth embodiment.

In another preferred form of the present invention, a room-temperature setting type matrix resin 18 is coated on the portion 15 to be reinforced to a thickness of, for example, about 100 μm, as shown in FIG. 20. Thereafter, a desired number of first and second reinforcing fiber sheets 1 are piled and pressed with the reinforcing fibers 4 and 6 facing the portion to be reinforced 15, by which the sheets 1 are attached and at the same time the reinforcing fibers 4 and 6 are impregnated with the matrix resin 18. In a case where the support sheet 2 is not the resin-penetrable type, each time the sheet 1 is placed on the previously placed sheet 1, the matrix resin may be coated on the support sheet 2 of the previously placed sheet 1. Thereafter, the first and second reinforcing fiber sheets 1 are covered with the press tape, and then left for a while to make the matrix resin set and thereby make the first and second reinforcing fiber sheets 1 fiber reinforced plastics. In this way, reinforcement of structures using the hybrid fiber reinforced plastic is conducted as in the aforementioned case.

Figure 21:
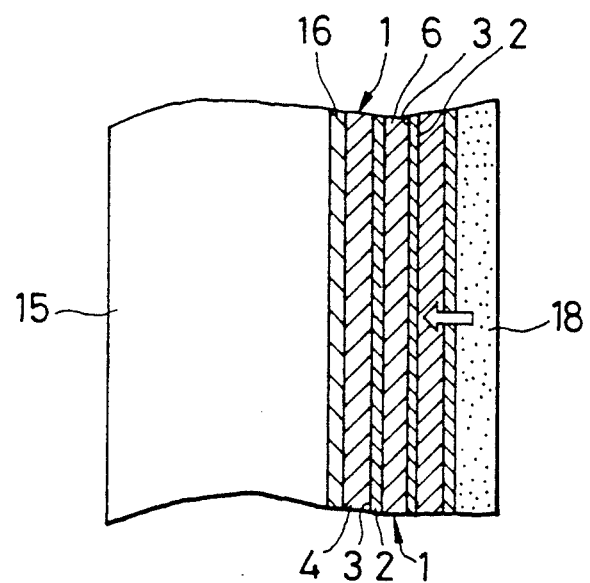
FIG. 21 explains another form of the reinforcing method in the fourth embodiment.

In another preferred form of the present invention, first and second reinforcing fiber sheets 1 with the resin-penetrable type support sheets 2 are used. As shown in FIG. 21, a resin of the same type as the matrix resin is coated on the portion 15 to be reinforced as a primer 16, and a desired number of first and second reinforcing fiber sheets 1 are then piled on top of another on the primer 16. Thereafter, the room-temperature setting matrix resin 18 is coated on the outermost sheet 1 by means of a roller or the like. The matrix resin penetrates the sheets 2 and then enters the reinforcing fibers 4 and 6. Thereafter, the first and second reinforcing fiber sheets 1 are covered with the press tape and then left untouched for a while to make the matrix resin 18 set and thereby make the first and second reinforcing fiber sheets 1 fiber reinforced plastics In this way, reinforcement of structures using the hybrid fiber reinforced plastics is conducted, as in the case of the aforementioned cases.

In the above-described reinforcing methods according to the present embodiment also, reinforcement of structures using the hybrid fiber reinforced plastics is conducted. Consequently, fracture strength and fracture toughness of the structure can be increased, as in the case of the second and third embodiments.

An example of the fourth embodiment will be described below.

Carbon fibers were provided on the support sheet as the rigid first reinforcing fibers at a unit weight of 175 $g/m^2$ and in one direction to manufacture the first reinforcing fiber sheet. Polyester fibers (trademark: Vectran, manufactured by Kurare) were provided on the support sheet as the tough second reinforcing fibers at a unit weight of 175 $g/m^2$ and in one direction to manufacture the second reinforcing fiber sheet.

The modulus of elasticity of the used carbon fibers was 23.5 $ton/mm^2$ in strand strength measurement method (JIS method), and the elongation thereof was 1.4%. The modulus of elasticity of the used polyester fibers was 8.5 $ton/mm^2$, and the elongation thereof was 2.5%.

After the reinforcing fibers of the first and second reinforcing fiber sheets were impregnated with the matrix resin which was a room-temperature setting type epoxy resin, the first and second reinforcing fiber sheets were adhered to each other and left at room temperatures to make the matrix resin set, by which the hybrid fiber reinforced plastic was obtained. Samples of the obtained fiber reinforced plastic had a width of 15 mm. Tests were conducted by applying a vertical load to the samples to measure the loads and elongations at the initial and final ruptures and thereby examine the effect of the fiber reinforced plastic made from the unidirectionally oriented reinforcing fiber sheets according to the present invention.

For comparison, reinforcing fiber sheets were manufactured by providing the carbon fibers employed in the above example on the support sheets at a unit weight of 175 $g/m^2$ and in one direction. The carbon fibers were impregnated with the matrix resin. Thereafter, the reinforcing fiber sheets were adhered with each other and then left to make the matrix resin set. The same tests were conducted on the samples.

Table 2 shows the results of the tests.

TABLE 2

| Initial Rupture Load Elongation | | Final Rupture Load Elongation | | Rigidity | Fracture Energy |
|---|---|---|---|---|---|
| (kg) | (%) | (kg) | (%) | (ton) | (kg. %) |
| Present Invention | | | | | |
| 557 | 1.00 | 522 | 2.49 | 55.7 | |
| (2.8) | (8.1) | (2.9) | (6.0) | (2.0) | 824 |
| Comparative Example | | | | | |
| — | — | 726 | 1.01 | 68.9 | |
| | | (9.1) | (8.1) | (2.3) | 367 |

In Table 2, the loads at the initial and final fractures are the average values of those obtained in the tests conducted seven times, and the elongations are the average values of five values. The numerals in parentheses are CV (coefficient of variation) values which indicate the degree of variation. The rigidity is the rigidity of the entire fiber reinforced plastic indicated in the form of load/elongation. The fracture energy is calculated by triangle approximation from the stress-strain curve similar to those shown in FIGS. 9 and 10.

As is clear from Table 2, since the first reinforcing fiber sheet employing the rigid carbon fibers and the second reinforcing fiber sheet using the tough polyester fibers are used to obtain a hybrid fiber reinforced plastic in the present invention, the elongation and fracture energy are about 2.5 times those of the non-hybrid fiber reinforced plastic obtained from the two reinforced fiber sheets with only the carbon fibers provided thereon, although the load at the final rupture is smaller. Consequently, fracture of the reinforcing fibers does not cause immediate final rupture, and safety of the reinforced structures with the fiber reinforced plastics is thus assured.

Fifth Embodiment

This embodiment is characterized in that a curing accelerator agent for accelerating the setting of the room-temperature setting type matrix resin is present in the adhesive layer 3 of the reinforcing fiber sheet 1 which is the same as that of the first embodiment described with reference to FIG. 1. Setting of the matrix resin is conducted due to the presence of the curing agent. Other configurations of the reinforcing fiber sheet 1 of this embodiment are the same as those of the reinforcing fiber sheet 1 of the first embodiment.

Generally, curing agent and curing accelerator are added to the matrix resin. The curing agent and curing accelerator are present in the room-temperature setting type matrix resin used in the first to fourth embodiments also. In this embodiment, in order to prolong the pot life of the room-temperature setting type matrix resin and thereby facilitate handling of the resin at the reinforcement cite, a curing accelerator is added not to the matrix resin but to the adhesive layer 3 of the reinforcing fiber sheet 1.

In this way, the room-temperature setting type matrix resin remains unset until the matrix resin is impregnated with the reinforcing fibers 4 of the reinforcing fiber sheet 1 and the room-temperature curing agent present in the matrix resin is thereby mixed with the curing accelerator present in the adhesive layer 3 of the reinforcing fiber sheet 1. Consequently, the pot life of the matrix resin can be prolonged, and handling of the resin can thus be facilitated. As a result, reinforcement work needs not be hastened with setting of the matrix resin taken into consideration, and workability can further be improved. Once the reinforcing fibers 4 are impregnated with the room-temperature type matrix resin and the curing agent is thereby mixed with the curing accelerator, setting reaction progresses and the matrix resin thus sets rapidly. Therefore, there is no problem involving the setting of the matrix resin.

Selection of the curing accelerator is adequately made depending on the type of matrix resin or curing agent added to the matrix resin. When an unsaturated polyester type resin, such as unsaturated polyester resin or vinyl ester resin, is used as the matrix resin, a peroxide type curing agent, such as methyl ethyl ketone peroxide, is used as the curing agent, and a cobalt type curing accelerator, such as cobalt naphthenate, is used as the curing accelerator.

Reinforcement of structures using the reinforcing fiber sheet 1 of this embodiment is conducted in a manner similar to those shown in FIGS. 5 to 7.

According to the reinforcing method which employs the reinforcing fiber sheet 1 of this embodiment, a troublesome work of the thermosetting the matrix resin at the reinforcement cite can be eliminated, and workability of reinforcement using the fiber reinforced plastic can thus be enhanced, as in the first embodiment. Furthermore, reinforcement of a curved portion is made possible.

Furthermore, in this embodiment, since the room-temperature setting type matrix resin remains unset until the matrix resin is impregnated with the reinforcing fibers 4 of the reinforcing fiber sheet 1 and the room-temperature curing agent present in the matrix resin is thereby mixed with the curing accelerator present in the adhesive layer 3 of the reinforcing fiber sheet 1, handling of the resin can be facilitated, and reinforcement work needs not be hastened with setting of the matrix resin taken into consideration. This improves workability of the reinforcement work.

In this embodiment, one type of reinforcing fibers 4 is used. However, two types of reinforcing fibers, the rigid reinforcing fibers 4 and the tough reinforcing fibers 6, may also be used to provide a hybrid reinforcing fiber sheet, as in the cases shown in FIGS. 8 and 14.

In that case, the pot life of the matrix resin can be prolonged and handling of the matrix resin used for reinforcing structures can thus be facilitated by adding the curing accelerator for accelerating setting of the room-temperature setting type matrix resin to the adhesive layer 3 of each reinforcing fiber sheet 1.

Examples of this embodiment will now be described below.

Glass cloth EPCO31, manufactured by Arisawa Seisakusho, was used as the support sheet. An epoxy resin film with cobalt naphthenate added thereto as the curing accelerator was used as the adhesive layer. Reinforcing fiber sheets (called reinforcing fiber sheets with a curing accelerator therein) were manufactured by providing glass fibers (GF) on the resin films on the support sheets. The obtained reinforcing GF sheets were impregnated with the room-temperature setting type matrix resin which as an unsaturated polyester type resin to estimate the setting characteristics (amount of remaining styrene) and thereby examine the effect of presence of the curing accelerator for the room-temperature setting type matrix resin in the adhesive layer of the reinforcing fiber sheet according to the present invention.

The unit weight of glass fibers in the reinforcing GF sheet was 350 g/m². A combination of Epikote 1001 and Epikote 828, manufactured by Yuka Shell K. K., was used as the adhesive epoxy resin film. Nodex CO8% (8% cobalt naphthenate dispersed in mineral turpentine), manufactured by Harima Kasei K. K., was used as cobalt naphthenate. Epoxy resin film with the curing accelerator agent added thereto was a resinous solution in which Epikote 1001, Epikote 828 and 8% Nodex CO were present in weight ratio of 73:7:20. This epoxy resin film with the curing accelerator added thereto was coated at a unit weight of 18 g/m².

The glass fibers of the reinforcing GF sheet were impregnated with the matrix resin by laminating on a PET film first the matrix resin, then reinforcing GF sheet, the matrix resin again, the reinforcing GF sheet again and finally the matrix resin. For setting, the matrix resin was left for eight days at room temperatures.

Two types of unsaturated polyester type resins, unsaturated polyester resin (UP) and vinyl ester resin (VE), were used as the room-temperature setting type matrix resin. Showa Kobunshi Regolak 150 HRN/Cayamek M (MEKPO) (MEKPO: a curing agent for unsaturated polyester, methyl ethyl ketone peroxide) were used as the unsaturated polyester resin/the curing agent. As the vinyl ester resin/the curing agent, Repoxy R-802/328E (328E: a curing agent for vinyl ester resin, manufactured by Kayaku Akuzo) were used.

For comparison, a reinforcing GF sheet (normally used reinforcing fiber sheet) was manufactured by providing glass fibers on the adhesive layer on the support sheet. The adhesive layer was the epoxy resin film to which no curing accelerator was added. The glass fibers were impregnated with the matrix resin in which cobalt naphthenene was present as the curing accelerator to estimate the setting characteristics of the matrix resin. The glass fibers of the reinforcing fiber sheet were also impregnated with the matrix resin in which no cobalt naphthenate was present to examine the setting characteristics of that matrix resin.

Table 3 shows the results of the examinations.

TABLE 3

| Reinforcing Fiber Sheet | Matrix Resin | Pot Life | Amount of Remaining Styrene (measured after 8 days at room temperature) |
| --- | --- | --- | --- |
| Present Invention | | | |
| 1 Reinforcing fiber sheet sheet with the curing accelerator therein | UP/Cayamek 2 phr | 10 hours or longer | 2.3 wt % |
| 2 Reinforcing fiber sheet with the curing accelerator therein | VE/328E 2 phr | 10 hours or longer | 3.2 wt % |
| Comparative Example | | | |
| 3 Normal reinforcing fiber sheet | UP/Cayamek 2 phr Cobalt 0.5 phr | 20 minutes | 1.7 wt % |
| 4 Normal reinforcing fiber sheet | VE/328E 2 phr Cobalt 0.5 phr | 20 minutes | 2.1 wt % |
| 5 Normal reinforcing fiber sheet | UP/Cayamek 2 phr | 10 hours or longer | Did not set |

As can be clear from Table 3, in Example Nos. 1 and 2 of the present invention, since the curing accelerator agent was added not to the matrix resin but to the adhesive layer, the pot life of the matrix resin increased to ten hours, like the case of Comparative Example No. 5, and the impregnation operation of the reinforcing fibers with the matrix resin, which was conducted by the lamination of the reinforcing GF sheets and the matrix resin, had not be hastened. Furthermore, since the matrix resin was left at room temperatures for eight days for setting, the amount of remaining styrene reduced to 2.3 to 3.2 wt%, which showed excellent setting of the matrix resin, as in the cases of Comparative Example Nos. 3 and 4 in which the curing accelerator agent was added to the matrix resin (in which the amount of styrene remaining in the matrix resin was 1.7 to 2.1 wt%).

In comparative Example Nos. 3 and 4, although the setting characteristics of the matrix resin were excellent, the pot life was twenty minutes and impregnation work had to be hastened with setting of the matrix resin taken into consideration. In Comparative Example No. 5, although handling of the matrix resin was easy, since curing accelerator was added to neither the adhesive layer nor matrix resin, setting of the matrix resin did not occur when the resin was left at room temperatures for eight days.

When the reinforcing fiber sheet 1 with the reinforcing fibers 4 provided on the support sheet 2 through the adhesive layer 3 is used for reinforcing structures, the room-temperature setting type matrix resin is impregnated with the reinforcing fibers 4 at the reinforcement cite. At that time, since the curing accelerator for accelerating setting of the matrix resin is added not to the matrix resin but to the adhesive layer 3 of the reinforcing fiber sheet 1 in this embodiment, the pot life of the matrix resin can be prolonged, and handling thereof can thus be improved.

As will be understood from the foregoing description, when the reinforcing fiber sheet according to the present invention is used for reinforcing structures, the reinforcing fibers thereof are impregnated with the matrix resin at the reinforcement cite, and then the reinforcing fiber sheet is placed on the portion to be reinforced and then left as it is to make it a fiber reinforced plastic. Consequently, workability of reinforcement work of structures, such as bridges or elevated roads, can be enhanced. Furthermore, since the reinforcing fiber sheet is a sheet on which reinforcing fibers are arranged in one direction, the resultant fiber reinforced plastic ensures increased reinforcement strength. Furthermore, since the curing accelerator for accelerating setting of the matrix resin is added not to the matrix resin but to the adhesive layer of the reinforcing fiber sheet, the pot life of the matrix resin can be prolonged, and workability of the reinforcement work is thus further improved.

What is claimed is:

1. A method of reinforcing a structure comprising the steps of:
    attaching to a surface of a portion of the structure to be reinforced at least one reinforcing fiber sheet comprising a support sheet and reinforcing fibers arranged in one direction on at least one surface of the support sheet with an adhesive layer therebetween; and
    setting a room-temperature setting type matrix resin impregnated in the reinforcing fibers.

2. A method of reinforcing a structure according to claim 1, wherein the reinforcing fibers are impregnated with the matrix resin by coating the matrix resin on the reinforcing fiber sheet before the reinforcing fiber sheet is attached to the surface of the portion of the structure to be reinforced.

3. A method of reinforcing a structure according to claim 1, wherein the reinforcing fibers are impregnated with the matrix resin by coating the matrix resin on the surface of the structure to be reinforced and then by attaching the reinforcing fiber sheet to the surface of the portion to be reinforced.

4. A method of reinforcing a structure according to claim 1, wherein the reinforcing fibers are impregnated with the matrix resin by attaching the reinforcing fiber sheet to the surface of the structure to be reinforced and then by coating the matrix resin on the reinforcing fiber sheet.

5. A method of reinforcing a structure according to claim 1, wherein a curing agent and a curing accelerator are present in the room-temperature setting type matrix resin.

6. A method of reinforcing a structure according to claim 1, wherein a curing agent is present in the room-temperature setting type matrix resin, and a curing accelerator is present in the adhesive layer.

* * * * *